Sept. 16, 1924.
G. F. BULL
1,508,505
GRASS EDGE TRIMMER OR CUTTER
Filed Dec. 29, 1922      2 Sheets-Sheet 1
Fig.1.
Fig.2.
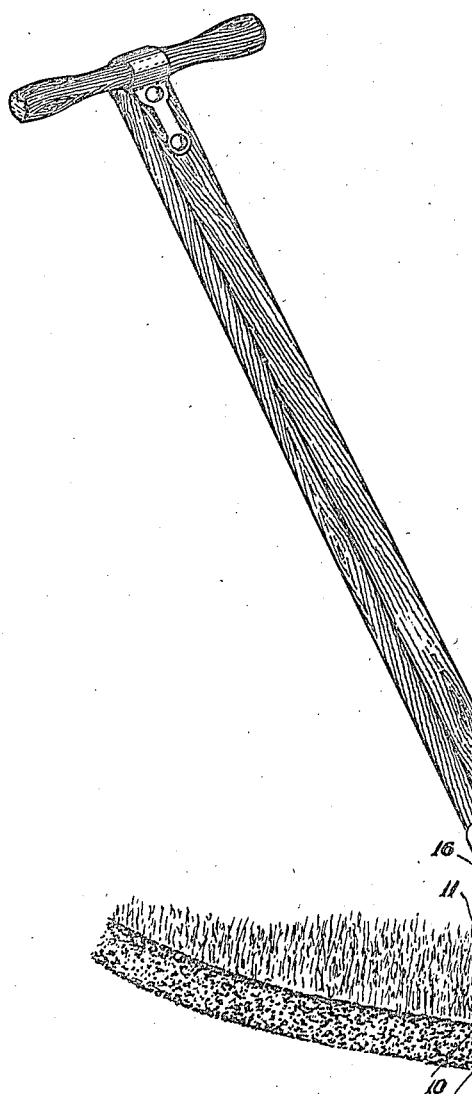
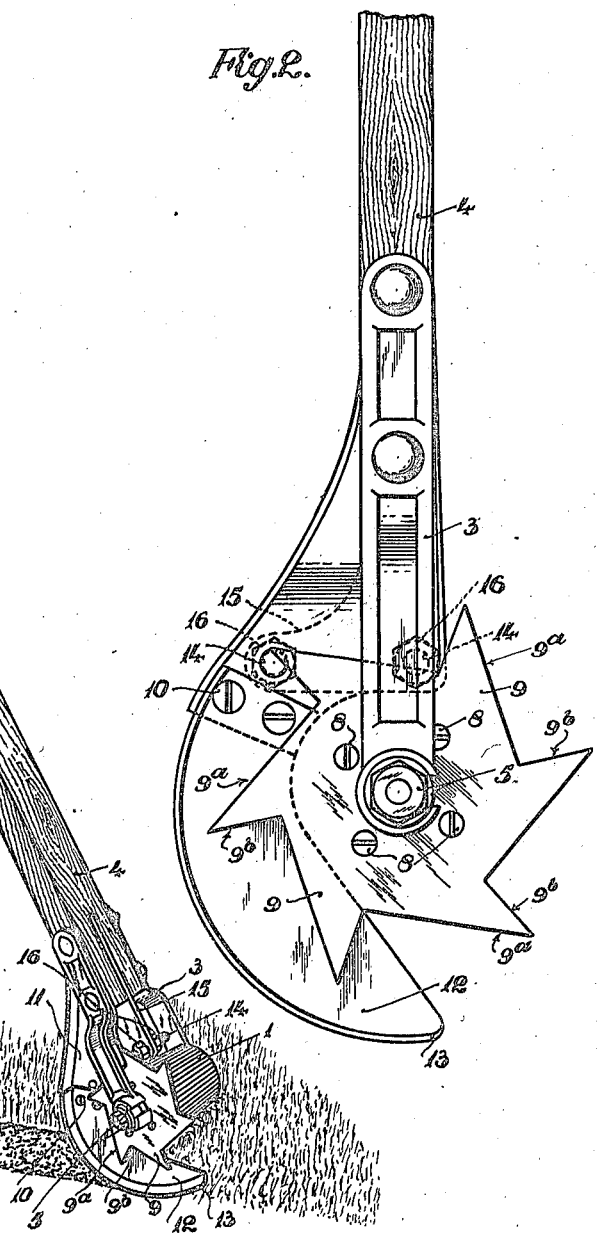
INVENTOR:
George F. Bull

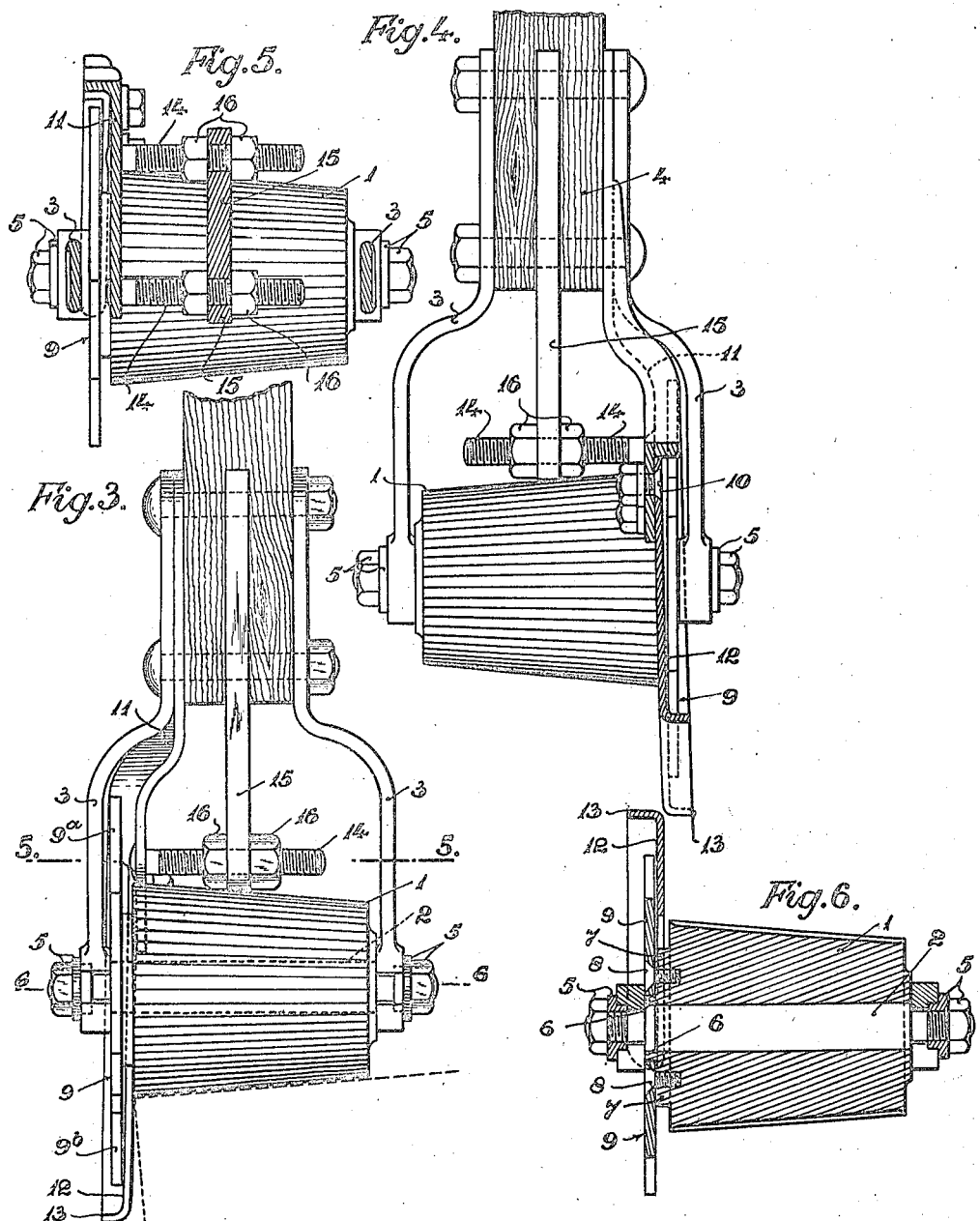

Patented Sept. 16, 1924.

1,508,505

UNITED STATES PATENT OFFICE.

GEORGE FREDERICK BULL, OF BIRMINGHAM, ENGLAND, ASSIGNOR OF ONE-HALF TO CHARLES H. PUGH LIMITED, OF BIRMINGHAM, ENGLAND.

GRASS-EDGE TRIMMER OR CUTTER.

Application filed December 29, 1922. Serial No. 609,574.

*To all whom it may concern:*

Be it known that I, GEORGE FREDERICK BULL, subject of the King of Great Britain, residing at Birmingham, England, have invented certain new and useful Improvements in Grass-Edge Trimmers or Cutters, of which the following is a specification.

This invention relates to edge trimmers or cutters for lawns, and of that type comprising a rotary cutter driven by means of a ground roller and arranged to co-operate with a fixed cutter. The object of the present invention is to provide an improved and simplified edge cutter or trimmer of this type which gives an efficient cutting action without leaving intervening spaces of uncut grass, and which is preferably constructed so that the edge of the fixed cutter is kept close up to the edge of the turf or grass; means being also preferably provided whereby the cutter may be adjusted laterally relatively to the rotary cutter to admit of the most efficient cutting action being obtained.

According to this invention the rotary cutter is mounted upon the ground roller, so as to rotate therewith, the blades of the said cutter being so shaped that the effective cutting edge of the whole of the blades is greater than or equal to the distance through which the roller moves during one revolution, the blades being preferably shaped so that they intersect the fixed cutter at the most efficient shearing angle, the fixed cutter preferably extending in a forward direction with its cutting edge presented upwards in a substantially horizontal plane. No intervening spaces of uncut grass are thus left by the machine, and owing to the rotary cutter being mounted directly upon the roller no part of the machine is liable to become clogged. The roller is preferably of a taper formation, with its larger end arranged adjacent the rotary cutter, the edge of the fixed cutter being thereby caused automatically to come close up against the edge of the turf or grass; further the fixed cutter is preferably of a spring construction so that its cutting edge bears closely against the edges of the blades of the rotary cutter when the latter is turned, the fixed cutter being adapted to be adjusted laterally relatively to the blades of the rotary cutter by means of bolts carried by a fixed part of the machine.

Figure 1 of the accompanying drawings is a perspective view of a grass edge trimmer or cutter constructed in accordance with this invention, showing substantially the position it assumes when in use.

Figure 2 is a side view of same upon a larger scale.

Figure 3 represents a front view, also upon a larger scale and showing more clearly the taper formation of the ground roller.

Figure 4 is a rear view of the lower portion of the edge trimmer or cutter.

Figure 5 represents a cross-section on the line 5—5 of Figure 3.

Figure 6 is a cross-section on the line 6—6 of Figure 3, showing the manner in which the rotary cutter is fixed directly to the roller.

The same reference numerals indicate corresponding parts in each of the figures.

Referring to the drawings, the improved grass edge cutter or trimmer comprises a ground roller 1 rotatably mounted upon a fixed central bolt or spindle 2. This spindle is carried by depending, laterally separated arms 3 attached to the lower end of a shaft or handle 4, the extremities of the spindle being reduced and screw-threaded, and arranged to engage with slots in the lower ends of the respective arms, being secured to the latter by nuts 5. The roller 1 is formed conically as shown, and is adapted to be moved over the surface of the grass adjacent and parallel to the edge which is to be trimmed or cut, the peripheral surface of the roller being preferably transversely grooved to prevent slipping. The larger end of the roller is formed with a concentric, integral boss 6, and fitted over this boss, up to an integral collar 7 on the roller, and secured to the larger end of the latter by screws 8, is a rotary cutter having a series of integral cutter-blades 9. the rotary cutter having a central hole which is engaged over the aforesaid boss 6. Each of the blades 9 is of a ratchet-shape, and is arranged in the manner shown in Figures 1 and 2 of the drawings, with their cutting edges $9^a$ disposed tangentially, and their non-cutting edges $9^b$ are disposed radially. Secured by screws 10 to an attachment plate 11 carried by the lower end of the handle 4 is a fixed cutter-plate 12. The upper edge of this cutter-plate is curved at its rear portion, the curved portion being arranged partly to encircle the collar 7, so as to come between the larger end of the roller 1 and the blades 9 of the rotary cutter, the main forward portion of the upper edge is straight, the cutter-plate 12 being disposed so that the said edge assumes a substantially horizontal position, when the machine is in use, as shown in Figure 1. This straight portion forms the cutting edge, and is arranged to bear closely against the successive blades 9 as they are rotated, the cutter-plate 12 being for this purpose of a spring construction. Owing to the shape of the blades 9 their cutting edges $9^a$ intersect the edge of the fixed cutter 12 at the most efficient shearing angle. The outer edge of the fixed cutter-plate 12 is preferably strengthened by an outwardly projecting flange 13. The effective cutting edge of the whole of the blades 9 of the rotary cutter is arranged to be greater than the distance through which the ground roller 1 moves during one complete revolution; consequently the grass is cut by the blades throughout the whole distance through which the machine is moved, without any intervening spaces of uncut grass. The edge $9^a$ of each of the blades is arranged to cut the grass for some distance in advance of the position of the roller. If this were not the case intervening portions of uncut grass would be left when the non-cutting edge $9^b$ of each blade moves past the fixed cutter 12 as the ground roller 1 is of course, moving forwardly when no cutting action is taking place. Each blade of the rotary cutter is arranged to cut the grass for such a distance ahead that only the outer portion of the edge $9^a$ of the succeeding blade has an effective cutting action. Not only is the grass cut in advance to allow for the non-cutting action of the edge $9^b$ of the blade, but also so that the inner portion of the succeeding blade may be allowed to move idly past the fixed cutter 12. Each blade thus has the most efficient cutting action, and the grass is prevented from becoming clogged between the inner portion of the edge of the blade and the fixed cutter 12 where the cutting angle is least effective. Owing to the taper formation of the roller 1, the cutting-edge of the fixed cutter-plate 12 may be brought closely against the edge of the grass, and the lower portion of the cutter-plate 12 projects out at an angle away from the vertical edge of the lawn, the periphery of the roller lying in a plane substantially at right angles to the said edge. The manner in which the lower portion of the fixed cutter projects away from the edge of the lawn may be seen from Figure 3, where the edge of the lawn is represented by dotted lines. As previously mentioned the cutter-plate 12 is of a spring construction, so that its cutting edge bears closely against the edges of the blades 9 as the latter revolve. It may, however, be adjusted in a lateral direction relatively to the edges of the blades 9 by means of a pair of separated screw-bolts 14. These bolts are each fixed at one of their ends to the attachment plate 11, and they are arranged to extend laterally towards the smaller end of the roller 1. They are each arranged to pass through holes in the lower end of a depending fixed plate 15 secured centrally to the lower end of the shaft or handle 4. A pair of nuts 16 are provided upon each bolt, one coming upon either side of the fixed plate 15. By adjusting these nuts the attachment plate 11 may be drawn inwards towards the plate 15, and the edge of the fixed cutter 12 moved laterally away from the blades; or the attachment plate 11 may be moved outwards and the edge of the fixed cutter 12 moved nearer to the said blades. The cutter-plate 12 may thus be readily adjusted to give the most efficient cutting action.

The fixed cutter may be of any suitable shape provided it extends in a forward direction, with its cutting edge presented upwards and disposed in a substantially horizontal position when the machine is in use.

Having fully described my invention what I desire to claim and secure by Letters Patent is:—

1. A grass edge trimmer comprising a ground roller, a rotary cutter carried by the ground roller, and a forwardly-extending fixed cutter disposed between the end of the ground roller and the rotary cutter, said fixed cutter having a substantially horizontal upwardly-disposed cutting edge and being adapted to engage against the edge of the grass over which the roller travels and serves as a guide.

2. A grass edge trimmer comprising a ground roller of taper formation, a rotary cutter carried by the ground roller, and a forwardly-extending fixed cutter adjacent the larger end of the ground roller and having an upwardly-presented cutting edge disposed in a substantially horizontal plane.

3. A grass edge trimmer comprising a ground roller, a ratchet-shaped rotary cutter, and a co-operating fixed cutter having an upwardly disposed substantially horizontal cutting-edge, the said fixed cutter being arranged between the end of the ground roller and the rotary cutter and being adapted to engage against the edge of the grass over which the roller travels and serve as a guide, the rotary cutter having tangentially-arranged cutting edges, the sum of the effective length of which are at least equal to the distance through which the roller moves during one revolution.

4. A grass edge trimmer comprising an operating handle-shaft, a ground roller rotatably carried by said shaft, a rotary cutter carried by the ground roller, a forwardly-extending fixed cutter having an upwardly-presented cutting edge disposed in a substantially horizontal plane, a rigid member carried by the handle-shaft, and screw adjusting devices carried by the rigid member and acting upon the fixed cutter for the purpose of adjusting the said fixed cutter laterally relatively to the rotary cutter.

5. A grass edge trimmer comprising an operating handle-shaft, a ground roller rotatably carried by said shaft, a rotary cutter carried by the ground roller, an attachment plate carried by said shaft, a forwardly-extending fixed cutter secured to said attachment plate, a rigid member carried by the handle-shaft, bolts secured at one end to the fixed cutter attachment plate and passing through holes in the rigid member, and adjusting nuts upon the bolts on opposite sides of the fixed member.

In testimony whereof I have hereunto set my hand.

GEORGE FREDERICK BULL.